(12) United States Patent
Larson et al.

(10) Patent No.: US 7,298,272 B2
(45) Date of Patent: Nov. 20, 2007

(54) REMOTE DETECTION EMPLOYING RFID

(75) Inventors: Thane M. Larson, Roseville, CA (US);
Christopher G. Malone, Loomis, CA (US); Martin O. Nicholes, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 241 days.

(21) Appl. No.: 11/118,021

(22) Filed: Apr. 29, 2005

(65) Prior Publication Data
US 2006/0244596 A1 Nov. 2, 2006

(51) Int. Cl.
*G08B 13/14* (2006.01)
*H04Q 5/22* (2006.01)

(52) U.S. Cl. .............................. 340/572.3; 340/10.34; 340/10.5

(58) Field of Classification Search .. 340/568.1–572.9, 340/10.1–10.6; 257/679; 439/180, 152, 439/266, 396; 361/834, 837; 700/215, 221, 700/225–227, 229
See application file for complete search history.

(56) References Cited

U.S. PATENT DOCUMENTS

| | | | |
|---|---|---|---|
| 5,629,981 A | 5/1997 | Nerlikar | |
| 5,874,902 A * | 2/1999 | Heinrich et al. | ......... 340/10.51 |
| 5,907,491 A | 5/1999 | Canada et al. | |
| 5,960,085 A | 9/1999 | de la Huerga | |
| 6,070,240 A | 5/2000 | Xydis | |
| 6,154,137 A | 11/2000 | Goff et al. | |
| 6,401,209 B1 | 6/2002 | Klein | |
| 6,747,560 B2 | 6/2004 | Stevens, III | |
| 6,813,209 B2 | 11/2004 | Crain et al. | |
| 6,825,754 B1 | 11/2004 | Rolin | |
| 6,832,251 B1 | 12/2004 | Gelvin et al. | |
| 6,838,989 B1 | 1/2005 | Mays et al. | |
| 6,842,121 B1 | 1/2005 | Tuttle | |
| 6,995,652 B2 * | 2/2006 | Carrender et al. | ......... 340/5.61 |
| 2002/0069364 A1 * | 6/2002 | Dosch | ......... 713/200 |
| 2003/0046339 A1 | 3/2003 | Ip | |
| 2004/0263319 A1 * | 12/2004 | Huomo | ......... 340/10.2 |
| 2006/0187046 A1 * | 8/2006 | Kramer | ......... 340/572.3 |
| 2006/0220795 A1 * | 10/2006 | Limbachiya | ......... 340/10.5 |

FOREIGN PATENT DOCUMENTS

WO WO 2004/006051 1/2004

OTHER PUBLICATIONS

Want, Roy, "Enabling Ubiquitous Sensing with RFID," Computer, Invisible Computing, pp. 84-86, (Apr. 2004).
National Semiconductor Corporation, "LM79 Microprocessor System Hardware Monitor," DS100036, pp. 1-30, (2001). <www.national.com>.
National Semiconductor Corporation, "Thermal Management Products," Selection Guide, pp. 5, (Fall 2004).

* cited by examiner

*Primary Examiner*—Benjamin C. Lee
*Assistant Examiner*—Jennifer Mehmood

(57) ABSTRACT

A system for remote detection using and RFID system including a transceiver, a transponder and a fuse configured within the transponder. The transceiver is configured to send and receive radio frequency signals. The transponder is configured to receive radio frequency signals from the transceiver and to send radio frequency signals to the transceiver. The transceiver is configured to send radio frequency to the transponder thereby preventing the fuse from blowing while the radio frequency signal is received.

27 Claims, 2 Drawing Sheets

REMOTE DETECTION EMPLOYING RFID

CROSS-REFERENCE TO RELATED APPLICATIONS

This Utility Patent Application is related to U.S. patent application Ser. No. 11/117,803, entitled "REMOTE MEASUREMENT EMPLOYING RFID," and U.S. patent application Ser. No. 11/117,994, entitled "REMOTE MEASUREMENT OF MOTION EMPLOYING RFID," which are all filed on even date herewith, are all assigned to the same assignee as the present application, and are all herein incorporated by reference.

BACKGROUND

The present invention relates to radio frequency (RF) communications, and more particularly, to radio frequency identification (RFID) systems. Wireless communication systems that communicate signals over the RF spectrum are well known in the art. One such system is the RFID system. Typically, an RFID system includes a transceiver having a transceiver antenna, and a tag or transponder having a transponder antenna. Typically, the transponder is electronically programmed with unique information. The transceiver periodically transmits RF interrogation signals to the transponder. Upon receiving an interrogation signal, the transponder responds by transmitting a response signal containing data.

RFID systems have been used in a variety of circumstances, such as for tracking inventory, tracking movements of objects, various security applications, and a variety of other applications. RFID systems have not, however, typically been employed in remote enabling devices. Consequently, there is a need for the present invention.

SUMMARY

One aspect of the present invention provides a remote detection system. The system includes a transceiver and a transponder. The transceiver is configured to send and receive radio frequency signals. The transponder is configured to receive radio frequency signals from the transceiver and to send radio frequency signals to the transceiver. The transponder also includes a fuse. The transceiver is configured to send radio frequency to the transponder thereby preventing the fuse from blowing while the radio frequency signal is received.

DETAILED DESCRIPTION

In the following Detailed Description, reference is made to the accompanying drawings, which form a part hereof, and in which is shown by way of illustration specific embodiments in which the invention can be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments can be utilized and structural or logical changes can be made without departing from the scope of the present invention. The following Detailed Description, therefore, is not to be taken in a limiting sense, and the scope of the present invention is defined by the appended claims.

Figure 1:
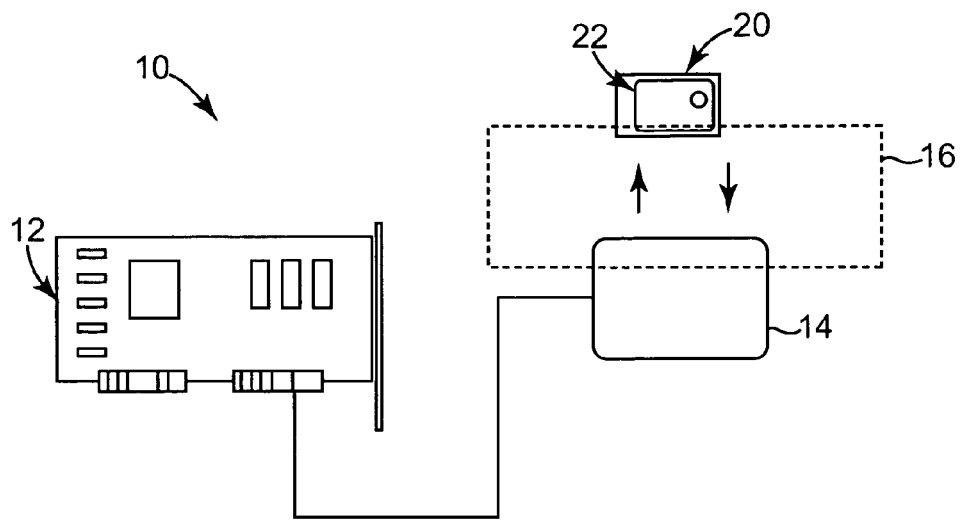
FIG. 1 is a block/schematic diagram illustrating an RFID system.

FIG. 1 illustrates radio frequency identification (RFID) system 10. RFID system 10 includes transceiver 12 and transponder 20. Transceiver 12 includes transceiver antenna 14. Transponder 20 includes transponder antenna 22. Signals generated by transceiver antenna 14 and by transponder antenna 22 are transferred through medium interface 16.

Transceiver 12 of RFID system 10 is configured to communicate with transponder 20. In one embodiment, transceiver 12 includes a microprocessor, and in another embodiment, transceiver 12 is coupled to a host system that includes a microprocessor. In one embodiment, transceiver antenna 14 is integrated within a single transceiver device. In one embodiment, transceiver 12 includes a separate transceiver circuit device and a separate transceiver antenna 14. Transceiver antenna 14 emits radio frequency signals that are transmitted through medium 16 to activate transponder 20. After activating transponder 20, transceiver 12 reads and writes data to and from transponder 20. Transceiver antenna 14 and transponder antenna 22 are the conduits between transceiver 12 and transponder 20, and communicate radio frequency signals through medium interface 16.

In some embodiments, medium interface 16 is air, and in other embodiments medium interface 16 includes air and other materials. Transceiver antenna 14 and transponder antenna 22 can be of a variety of shapes and sizes, dependent upon the anticipated distance separating them, the type of medium 16 that is between antennas 14 and 22, and on other factors.

Transceiver 12 typically performs a variety of functions in controlling communication with transponder 20. In one case, transceiver 12 emits output signals from transceiver antenna 14, thereby establishing an electromagnetic zone for some distance adjacent antenna 14. When transponder 20 passes through the electromagnetic zone established by transceiver antenna 14, transponder 20 detects an activation signal from transceiver 12. Transponder 20 typically has integrated circuits that include data that is encoded in memory. Once transponder 20 is activated with the activation signal, transceiver 12 decodes data that is encoded in transponder 20. For instance, in one embodiment transceiver 12 performs signal conditioning, parity error checking and correction.

Typically, transceiver 12 emits radio waves in ranges from a few millimeters up to hundreds of feet or more, depending on its output power and upon the radio frequency used. In one case, transceiver 12 is integrated in a circuit board card that is then coupled to a host computer, which processes the received data and controls some of the communication with transponder 20.

Figure 2:
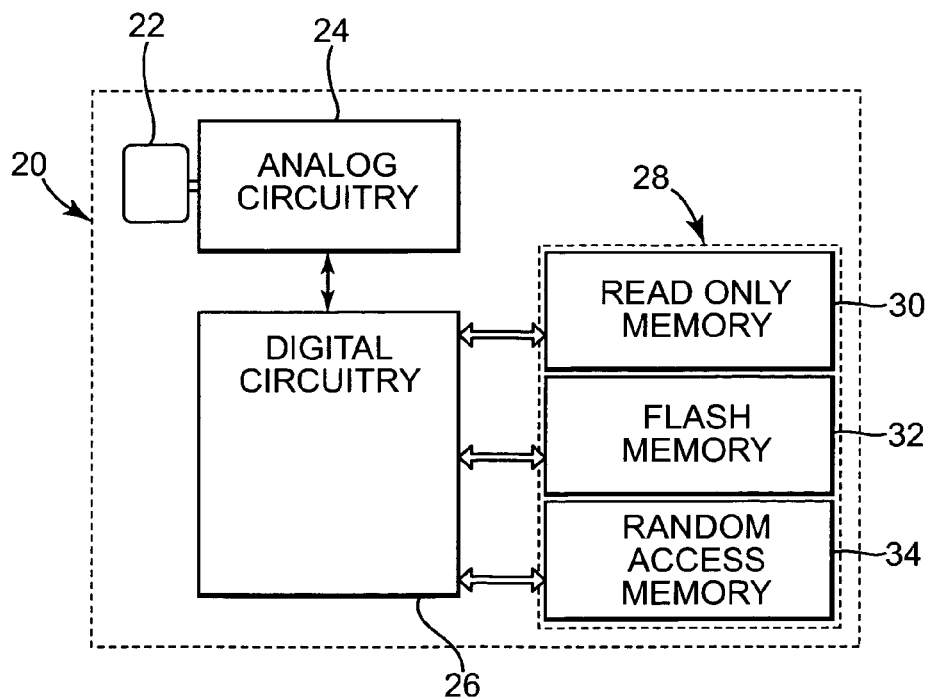
FIG. 2 is a block diagram illustrating a transponder.

FIG. 2 illustrates one embodiment of transponder 20. In one embodiment, transponder 20 includes transponder antenna 22, analog circuitry 24, digital circuitry 26, and memory 28. In various embodiments, memory 28 can include read only memory (ROM) 30, flash memory 32, and/or random access memory (RAM) 34.

Transponder 20 comes in a variety of shapes and sizes for use in a variety of applications. For example, in one embodiment transponder 20 is configured as a small cylindrical-shaped tube having a diameter the size of a typical pencil lead. For example, such a transponder can be inserted beneath the skin of an animal to facilitate tracking the animal. In another embodiment, transponder 20 is screw-shaped such that it is screwed into trees or wooden items for identification or related purposes. In still other cases, transponder 20 is credit-card shaped for use in a multitude of access and/or security applications. In another embodiment, transponder 20 is embedded in hard plastic tags attached to merchandise in stores for security purposes, and in other embodiments it is in heavy-duty relatively large cases that are used to track inter-modal containers or heavy machinery, as well as a variety of other applications.

In some embodiments, transponder 20 includes one or more types of memory 28. For example, in some embodiments memory 28 includes ROM 30 to accommodate security data and operating system instructions that are employed in conjunction with analog circuitry 24 and digital circuitry 26 to control the flow of data within transponder 20. In other embodiments, memory 28 includes RAM 34 to facilitate temporary data storage during a time period when transceiver 12 is interrogating transponder 20 for a response. In other embodiments, memory 28 includes flash memory 32 to store data in transponder 20 that is non-volatile in order to ensure that the data is retained when transponder 20 is in a quiescent or power saving state. In some embodiments, memory 28 includes other types of non-volatile programmable memory, such as programmable read-only memory (PROM), erasable programmable read-only memory (EPROM), and electrically erasable programmable read-only memory (EEPROM). Any one of memory types ROM 30, flash memory 32 (or other non-volatile programmable memory), or RAM 34 can be used, or any combination thereof can be used.

In one embodiment, transponder 20 is an active transponder device. An active transponder is powered by an internal energy source, such as a battery configured within analog circuitry 24. Such active transponders are typically "read/write," which means data stored within memory 28 of transponder 20 can be rewritten and/or modified. An active transponder can also be powered from an existing source in another electronic device. For example, where transponder 20 is an active transponder coupled within a computer system, the power supply within the computer system supplies power to the transponder.

In one embodiment, transponder 20 is a passive transponder device. Passive transponders operate without a separate internal power source and obtain operating power from transceiver 12. Rather than having a battery within analog circuitry 24, for example, passive tags instead can use a strongly capacitive circuit and a charge pump within analog circuitry 24. The capacitive circuit and charge pump are configured to receive radio frequency energy from transceiver 12 and store it for use within transponder 20, for example, to control digital circuit 26 and memory 28.

Since active transponders accommodate an internal battery, they are typically larger in size than passive transponders. Memory size within an active transponder varies, but can be fairly significant with some systems operating, for example, with up to a megabyte or more of memory. Active transponders also typically have a longer ready range such that transceiver 12 and transponder 20 are typically placed apart at greater distances than in the case of passive transponders. In the same way, passive transponders typically have shorter read ranges, but are typically much smaller and lighter than active transponders and are typically less expensive.

In addition to including a battery for active transponders or capacitive circuit and charge pump for passive transponders, analog circuitry 24 typically include interface circuits for data transfer between transponder antenna 22 and digital circuitry 26. Digital circuitry 26 in turn typically includes control logic, security logic, and internal logic or microprocessor capabilities. This control logic controls the flow of data to and from memory 28.

Figure 3:
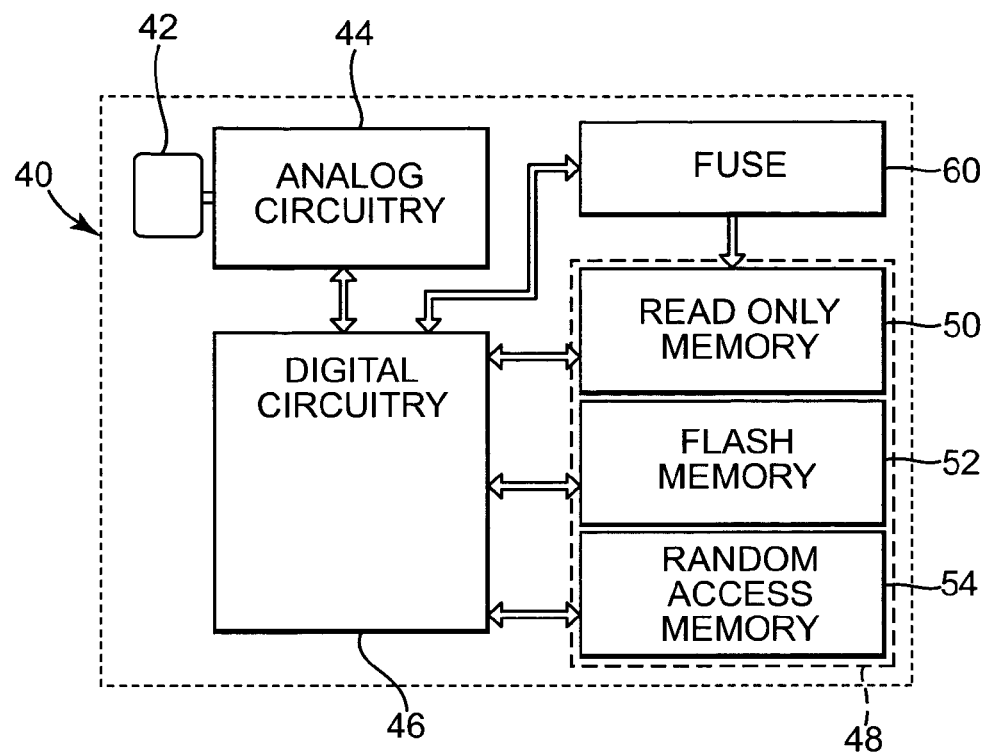
FIG. 3 is a block diagram illustrating a transponder in accordance with one embodiment of the present invention.

FIG. 3 illustrates transponder 40 in accordance with one embodiment of the present invention. Transponder 40 includes transponder antenna 42, analog circuitry 44, digital circuitry 46, read only memory (ROM) 50, flash memory 52, random access memory (RAM) 54, and fuse 60. In one embodiment, fuse 60 is configured to allow continued operation of transponder 40 when not blown. When fuse 60 is blown, however, transponder 40 becomes inoperable such that communication with transponder 40 with a transceiver is no longer possible.

In one embodiment, fuse 60 is configured to disable transponder 40 under certain conditions and allow it to function in other conditions. In operation, transponder 40 is used in conjunction with a transceiver such that a transceiver first sends radio frequency (RF) signals to transponder 40. These RF signals are received via transponder antenna 42 and sent to analog circuitry 44. In one embodiment, analog circuitry 44 includes a capacitive circuit and a charge pump. In this way, received RF signals charge the capacitive circuit within analog circuitry 44. The storage energy is then used to energize digital circuitry 46.

In one embodiment, digital circuitry 46 includes control circuitry for activating flash memory 52, RAM 54, and ROM 50 as well as fuse 60. In this way, upon continued or periodic activation by digital circuitry 46, fuse 60 stays enabled such that transponder 40 sends RF signals back to the transponder. In one embodiment, the transceiver then subsequently interrogates transponder 40 in order to read a digitized code stored in memory 48 of transponder 40. When RF signals are no longer continually or periodically received by transponder 40 from the transceiver, however, fuse 60 will blow and disable transponder 40. In this way, transponder 40 will no longer be able to send RF signals back to the transceiver.

In one embodiment, transponder 40 will no longer receive RF signals from the transceiver when transponder 40 is out of a set range of the transceiver. In this way, whenever the transponder 40 is out of this set range of the transceiver, fuse 60 will blow, thereby disabling transponder 40. In one embodiment fuse 60 is an electronic fuse.

Figure 4:
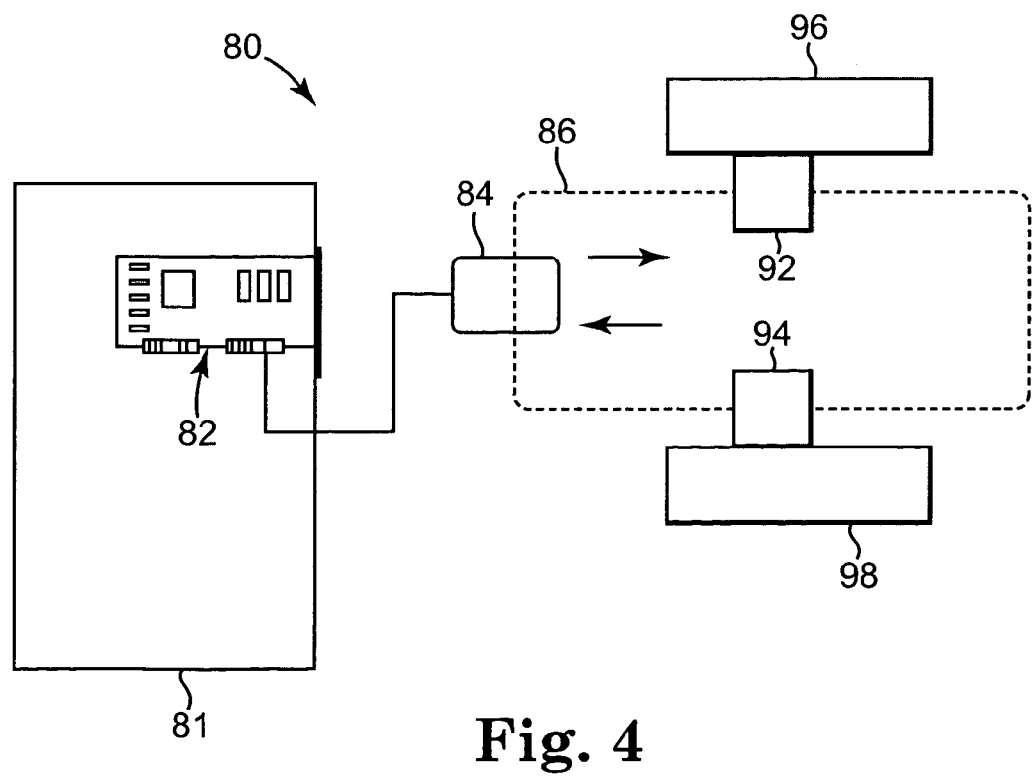
FIG. 4 is a block/schematic diagram illustrating an RFID system in accordance with one embodiment of the present invention.

FIG. 4 illustrates RFID system 80 in accordance with one embodiment of the present invention. RFID system 80 includes computer system 81 having a transceiver 82. Transceiver 82 has a transceiver antenna 84, which can be embedded or external to transceiver 82. RFID system 80 further includes first and second transponders 92 and 94, which are coupled to first and second system components 96 and 98, respectively. Medium interface 86 is between transceiver antenna 84 and first and second transponders 92 and 94.

In one embodiment of the present invention, RFID system 80 is used in conjunction with assuring the security of computer system 81. In the way, RFID system 80 detects whether first and second system components 96 and 98 have been removed from the proximity of computer system 81 by having transceiver 82 remotely detect the presence of transponders 92 and 94. Because transponders 92 and 94 are fixed to first and second system components 96 and 98, RFID system 80 determines that first and second system components 96 and 98 have been removed from the proximity of computer system 81 when transponders 92 and 94 are out of range of transceiver 82. Thus, RFID system 80 disables computer system 81 when transponders 92 and 94 are out of range of transceiver 82.

In one embodiment, RFID system 80 utilizes first and second transponders 92 and 94 and transceiver 82, which is embedded in an electronic module such as computer system 81. Transceiver 82 is configured to scan the proximity of medium interface 86 specifically for first and second transponders 92 and 94. In one embodiment, transponders 92 and 94 are configured like transponder 40 in FIG. 3, such that each has a memory and a fuse. A unique identification code is stored in each memory of transponders 92 and 94. If transceiver 82 scans and receives the unique code from each of transponders 92 and 94, then computer system 81 is allowed to function normally. If transceiver 82 scans and does not receive the unique code from each of transponders 92 and 94, however, then the fuse (or several fuse links in some embodiments) is blown.

In one embodiment, computer system 81 further includes an embedded-security device such as a Trusted Platform Module (TPM). TPM is known to those skilled in the art as a means for authenticating internal and external communications to a computer or computer system by using an encrypted digital signature. TPMs typically provide authentication of components of computing systems that are not transferable from system to system. In other words, the security of a computing system can be compromised if the TPM is moved from one system to another. In one embodiment, each of first and second system components 96 and 98 are TPMs. In this way, corresponding transponders 92 and 94 are embedded in TPMs 96 and 98. In one embodiment, TPMs 96 and 98 are physically connected within computer system 81 and in another embodiment TPMs 96 and 98 are coupled externally to computer system 81.

Thus, with one embodiment of RFID system 80, TPMs 96 and 98, along with embedded transponders 92 and 92, can be physically disconnected from computer system 81 without sacrificing or compromising the security of the system, as long as the modules are not moved out of the range established between transceiver 82 and its associated transponders 92 and 94. Thus, for example, TPMs can be removed from computer system 81 to allow repair, as long as the TPMs and embedded transponders 92 and 92 stay within range of associated transceiver 82. RFID system 80 only blows fuses within transponders 92 and 94 embedded in TPMs 96 and 98 when TPMs 96 and 98 are powered on and far enough away from away from transceiver 82. Transceiver 82 is essentially "keyed" to transponders 92 and 94 in that it sends RF signals to transponders 92 and 94 in order to receive back the unique code stored therein. If the code is not received, the fuses are blown and the TPM is disabled. In this way, RFID system 80 provides security of computer system 81 with an embedded TPM.

In one embodiment, transponders 92 and 94 each contain a one-time programmable number in their respective memories. Transceiver 82 then sends RF signals to the transponders, and receives the one-time programmable number when transponders 92 and 94 are in range to verify a match. Thus, the transceiver 82 will only check for a match if it has been programmed with the value of transponders 92 and 94.

In one embodiment, the transponders 92 and 94 are transponder types that are typically attached to the system in a label, or are physically embedded in the computer system. This provides added security benefit. In this way, if the TPM with embedded transponder is removed and placed in a computer system without the matching transceiver, the TPM will be made permanently inoperable. Since, the TPM is typically tied to a particular computer system of a particular system manufacturer, RFID system 80 appropriately destroys or disables the TPM that has been removed from the proper system. At the same time, however, RFID system 80 still allows legitimate repair of a system, where the TPM has to be removed, but not moved out of the proximity of the corresponding transceiver.

In one embodiment, RF signals received from transceiver 82 are received by the associated transponder antenna within first and second transponders 92 and 94, and sent to analog circuitry, which in one case includes a capacitive circuit and charge pump. Energy stored in the capacitive circuit is then used to control digital circuitry within each of first and second transponders 92 and 94. When first and second transponders 92 stop receiving RF signals, the digital circuitry is configured to activate or blow the fuse such as the transponders become disabled. In this embodiment, continued RF signal from transceiver 82 is needed to continue enabling the fuses and the transponders.

In one embodiment, RFID system 80 includes first and second transponders 92 and 94, which are active transponders. In this embodiment, first and second transponders 92 and 94 are configured such that each has a battery or similar energy storage device within the analog circuitry of each transponder. This provides an RFID system 80 with more flexible range, meaning that first and second transponders 92 and 94 are operable even when placed a further distance from transceiver 82.

In one embodiment, RFID system 80 includes first and second transponders 92 and 94, which are passive transponders. In one such embodiment, first and second transponders 92 and 94 are configured very similarly to transponder 40 illustrated in FIG. 3. In this way, a capacitive circuit and charge pump are provided within the analog circuitry of each of first and second transponders 92 and 94.

In one embodiment of these passive first and second transponders 92 and 94, each can also further include a charge building device. In this way, radio frequency signals received from transceiver 82 by first and second transponders 92 and 94 builds up additional charge over a period of time. This additional built-up charge can then be used to power the control circuitry within first and second transponders 92 and 94. In this way, RF signals are sent by transceiver 82 to first and second transponders 92 and 94 over a first period of time. Subsequently, that charge is released and used to power control circuitry over a second period of time, which is a shorter period of time than the first. In this way, a relatively large signal is generated within each of first and second transponders 92 and 94 due to the quicker dispensing of that stored energy relative to how it was received. In one embodiment, the charge building device within passive first and second transponders 92 and 94 is a capacitive ladder, or similar circuitry for building and storing energy over time.

In an alternative embodiment of RFID system 80, a transceiver is embedded within the TPM rather than the transponders. Furthermore, the transceiver is configured with a fuse, rather than the transponder. In this way, in operation of the alternative system the TPM with embedded transceiver can also be physically disconnected from computer system 81 without sacrificing or compromising the security of the system, as long as the modules are not moved out of the range established between the transceiver embedded in the module and its associated transponder. Thus, for example, the TPM can be removed from the computer system to allow repair, as long as the TPM and embedded transceiver stays within range of associated transponder. The alternative RFID system only blows fuses within the transceiver embedded in the TPM when the TPM is powered on and far enough away from away from transponder. In this way, the alternative RFID system provides security of the computer system with an embedded TPM.

In one embodiment, computer system 81 is a rack-level server implementation where first and second components 96 and 98 are individual servers. In another embodiment, computer system 81 is an individual server where first and second components 96 and 98 are integrated within computer system 81. In this way, first and second components 96 and 98 are, for example, blade computers, disks, memory, I/O cards, or related components.

Although specific embodiments have been illustrated and described herein, it will be appreciated by those of ordinary skill in the art that a variety of alternate and/or equivalent implementations can be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A remote detection system, comprising:
   a transceiver configured to send and receive radio frequency signals;
   a transponder configured to receive radio frequency signals from the transceiver and to send radio frequency signals to the transceiver;
   a fuse within one of the transponder and the transceiver;
   wherein the transceiver is configured to send a radio frequency signal to the transponder thereby preventing the fuse from blowing while the radio frequency signal is received and wherein the fuse is configured to blow in response to no longer receiving the radio frequency signal from the transceiver.

2. The remote detection system of claim 1, wherein the transponder further includes a transponder memory configured to store a unique identification code.

3. The remote detection system of claim 2, wherein the transceiver is further configured to interrogate the transponder in order to receive the identification code.

4. The remote detection system of claim 1, wherein the transceiver is unable to receive the identification code once the fine is blown.

5. The remote detection system of claim 4 further comprising a trusted platform module in which the transponder is embedded, wherein the trusted platform module is disabled once the fuse is blown.

6. The remote detection system of claim 4 further comprising a trusted platform module in which the transceiver is embedded, wherein the trusted platform module is disabled once the fuse is blown.

7. The remote detection system of claim 1, wherein the transponder is an active transponder further comprising analog circuitry configured with a battery.

8. A remote detection system, comprising:
   a transceiver configured to send and receive a radio frequency signal signals:
   a transponder configured to receive radio frequency signals from the transceiver and to send radio frequency signals to the transceiver;
   a fuse within one of the transponder and the transceiver;
   wherein the transceiver is configured to send radio frequency to the transponder thereby preventing the fuse from blowing while the radio frequency signal is received;
   wherein the transponder is a passive transponder further comprising analog circuitry configured with a charge circuit and a capacitor such that radio frequency signals received from the transceiver supply energy to the charge circuit and a capacitor, and wherein the energy within the charge circuit and capacitor is used to control the blowing of the fuse.

9. The remote detection system of claim 8, wherein the analog circuitry of the transponder further comprises a capacitor ladder circuit such that radio frequency signals received from the transceiver build up energy over time.

10. The remote detection system of claim 1, wherein the fuse is embedded in the transponder.

11. The remote detection system of claim 1, wherein the fuse is embedded in the transceiver.

12. A computer system, comprising:
    a transceiver configured to send and receive radio frequency signals;
    a trusted platform module;
    a transponder within the trusted platform module and configured to receive radio frequency signals from the transceiver and to send radio frequency signals to the transceiver; and
    a fuse within the transponder, wherein the fuse is configured to be selectively blown, and wherein blowing the fuse disables the trusted platform module.

13. The computer system of claim 12, wherein the fuse is configured to be blown in response to the transponder no longer receiving radio frequency signals from the transceiver.

14. The computer system of claim 13, wherein the transponder and the transceiver have a range within which radio frequency signals are communicated between them and outside of which radio frequency signals cannot be communicated between them.

15. The computer system of claim 12 further comprising a transceiver antenna coupled to the transceiver via which the radio frequency signals are communicated.

16. The computer system of claim 15 further comprising a transponder antenna coupled to the transponder via which the radio frequency signals are communicated.

17. A remote detection system comprising:
    a transceiver configured to send and receive radio frequency signals; and
    a transponder configured to send and receive radio frequency signals to and from the transceiver, the transponder including:
    means for disabling the transponder in response to radio frequency signals no longer being received from the transceiver.

18. The remote detection system of claim 17, wherein the transponder further comprises an antenna and a fuse, and wherein the transponder is configured to blow the fuse in response to radio frequency signals no longer being received from the transceiver.

19. The remote detection system of claim 18, wherein the transponder is embedded in a trusted platform module and further configured such that disabling the transponder also disables the trusted platform module.

20. The remote detection system of claim 19, wherein the transponder is a passive transponder further comprising analog circuitry configured with a charge circuit and a capacitor such that radio frequency signals received from the transceiver supply energy to the charge circuit and a capacitor, and wherein the energy within the charge circuit and capacitor is used to control the blowing of the fuse.

21. A transponder comprising:
a circuit configured to receive and send radio frequency signals; and
a fuse coupled to the circuit;
wherein the circuit provides power for controlling enabling and disabling of the transponder by controllably blowing the fuse when the radio frequency signals are no longer received.

22. The transponder of claim 21, wherein blowing the fuse occurs in response to the circuit no longer receiving radio frequency signals.

23. A method of remote detection comprising:
sending radio frequency signals from a transceiver to a transponder;
enabling a fuse within the transponder not to blow as long as radio frequency signals are continually received from the transceiver; and
causing the fuse within the transponder to blow in response to the radio frequency signals no longer being received from the transceiver.

24. The method of claim 23, further including disabling a trusted platform module when the fuse within the transponder blows.

25. A method securing a computer system comprising:
sending radio frequency signals from a transceiver to a transponder embedded in a trusted platform module within the computer system;
charging an analog circuit within the transponder from the radio frequency signals received from the transceiver and
activating a fuse within the transponder using the charged analog circuit such that the fuse is not blown; and
disabling the rusted platform module by blowing the fuse within the transponder in response to radio frequency signals no longer being received from the transceiver.

26. The method of claim 25, wherein charging the analog circuitry further comprises using the radio frequency signals received from the transceiver to charge a charge circuit and a capacitor.

27. The method of claim 26, wherein charging the analog circuitry further comprises using the radio frequency signals received from the transceiver to charge a charge circuit and a capacitor ladder circuit such that radio frequency signals received from the transceiver build up energy over time.

* * * * *

UNITED STATES PATENT AND TRADEMARK OFFICE
CERTIFICATE OF CORRECTION

PATENT NO. : 7,298,272 B2  
APPLICATION NO. : 11/118021  
DATED : November 20, 2007  
INVENTOR(S) : Thane M. Larson et al.

It is certified that error appears in the above-identified patent and that said Letters Patent is hereby corrected as shown below:

In column 7, line 50, in Claim 4, delete "fine" and insert -- fuse --, therefor.

In column 7, line 63, in Claim 8, after "receive" delete "a".

In column 7, line 64, in Claim 8, after "frequency" delete "signal".

In column 7, line 64, in Claim 8, after "signals" delete ":" and insert -- ; --, therefor.

In column 8, line 2, in Claim 8, after "send" insert -- a --.

In column 8, line 3, in Claim 8, after "frequency" insert -- signal --.

In column 10, line 7, in Claim 25, after "transceiver" insert -- ; --.

In column 10, line 11, in Claim 25, delete "rusted" and insert -- trusted --, therefor.

Signed and Sealed this

Seventeenth Day of November, 2009

David J. Kappos  
*Director of the United States Patent and Trademark Office*